(12) United States Patent
Girard et al.

(10) Patent No.: US 8,234,913 B2
(45) Date of Patent: Aug. 7, 2012

(54) HIGHER HARMONICS ATOMIC FORCE MICROSCOPE

(75) Inventors: Paul Girard, Montpellier (FR); Michel Ramonda, Saint Drezery (FR); Richard Arinero, Montpellier (FR)

(73) Assignees: Centre National de la Recherche Scientifique—CNRS, Paris (FR); Universite de Montpellier II, Montpellier (FR)

( * ) Notice: Subject to any disclaimer, the term of this patent is extended or adjusted under 35 U.S.C. 154(b) by 210 days.

(21) Appl. No.: 11/922,699

(22) PCT Filed: Jun. 21, 2006

(86) PCT No.: PCT/FR2006/001406
§ 371 (c)(1),
(2), (4) Date: Dec. 21, 2007

(87) PCT Pub. No.: WO2006/136705
PCT Pub. Date: Dec. 28, 2006

(65) Prior Publication Data
US 2008/0223120 A1    Sep. 18, 2008

(30) Foreign Application Priority Data
Jun. 23, 2005 (FR) .................................... 05 06402

(51) Int. Cl.
*G01B 5/28*    (2006.01)
(52) U.S. Cl. ......................................................... 73/105
(58) Field of Classification Search .................... 73/105; 250/306
See application file for complete search history.

(56) References Cited

U.S. PATENT DOCUMENTS
6,006,593 A    12/1999    Yamanaka

FOREIGN PATENT DOCUMENTS
| JP | 08-211078 | 8/1996 |
| JP | 09-159681 | 6/1997 |
| JP | 10-054835 | 2/1998 |
| JP | 2002-062245 | 2/2002 |
| JP | 2003-065935 A | 3/2003 |
| JP | 2004-157093 | 6/2004 |

OTHER PUBLICATIONS

Sahin et al., "Harmonic Cantilevers for Nanomechanical, Sensing of Elastic Properties", vol. 2, Jun. 9, 2003, pp. 1124-1127.

(Continued)

*Primary Examiner* — Hezron E Williams
*Assistant Examiner* — Alex Devito
(74) *Attorney, Agent, or Firm* — Arent Fox LLP (57) ABSTRACT

The invention concerns a microscopic system with atomic force, comprising a probe tip placed on one end of a lever arm (2), oscillating means (1) adapted to oscillate said probe tip substantially based on the fundamental frequency of said lever arm, said system including control means (7) for controlling said oscillating means to vary the oscillation frequency of said tip based on a plurality of harmonics of said lever arm. The invention is characterized in that said control means comprise an input receiving a parameter representing an operating threshold of said system, to vary the oscillation frequency of said tip based on at least one harmonic of said lever arm when said signal corresponds to a state of said system higher than said operating threshold.

14 Claims, 7 Drawing Sheets

OTHER PUBLICATIONS

Yamanaka et al., Ultrasonic atomic force microscope with overtone excitation of cantilever, vol. 35, No. 6B, Jun. 1996, pp. 3787-3792.
Stark, et al. "Tapping Mode Atomic Force Microscopy and Phase-Imaging in Higher Eigenmodes", vol. 74, No. 22, May 31, 1999.
Schiener, et al., "Stabilized Atomic force Microscopy and phase-imaging in higher eigenmodes", vol. 75, No. 8, Aug. 2004.
Sahin et al., "Resonant harmonic response in tapping-mode atomic force micrscopy", vol. 69, No. 16, Apr. 15, 2004.
P. Girard et al., "Dynamic atomic force microscopy operation based on high flexure modes of the cantilever", Review of Scientific Instruments, Sep. 12, 2006, 77, 096105-1.
L. Portes et al., "Force gradient detection under vacuum on the basis of a double pass method", Review of Scientific Instruments, Sep. 8, 2006, 77, 096101-1.
Sahini O. et al.; "An Atomic Force Microscope Tip Designed to Measure Time-Varying Nanomechanical Forces" ; Nature nanotechnology; Published online: Jul. 29, 2007; doi 10.1038/nnano.2007.226.

HIGHER HARMONICS ATOMIC FORCE MICROSCOPE

CROSS-REFERENCE TO RELATED APPLICATION

This applicatioin is a National Stage entry of International Application No. PCT/FR2006/001406, having an international filing date of Jun. 21, 2006; which claims priority to French Application No.: 0506402, filed Jun. 23, 2005.

The present invention relates to the field of near-field microscopes in vibration mode.

It relates more particularly to such microscopes operating in "controlled or regulated amplitude" mode.

The general principle of near-field microscopes in vibration mode is known to those skilled in the trade. In such a device, a sensor is made to vibrate near its fundamental resonant frequency and, when it approaches the object to be analysed, its amplitude of vibration is reduced. There can be two possible reasons for this. According to a first mode, the sensor detects forces with a long range of action, of electromagnetic type. In this case, the oscillator slightly changes its resonant frequency and its oscillation amplitude is forced to change. This is known as "contactless" mode. According to a second mode, the sensor oscillates and comes into intermittent contact with the material, the vibration amplitude being limited by the contact with the object. This mode is known as "tapping".

In general terms, the object to be analysed is scanned substantially in the plane of the object surface (hereinafter xy), and a feedback loop adjusts the position of the object in z to maintain the vibration amplitude at a set value. The position variations in z therefore provide the morphology of the material.

In the air or in a controlled atmosphere, the feedback affects the amplitude of vibration while, in a vacuum, in known systems, the feedback affects the resonant frequency shift, due to limitations in the response time of the oscillator, as will be explained below.

Figure 1:
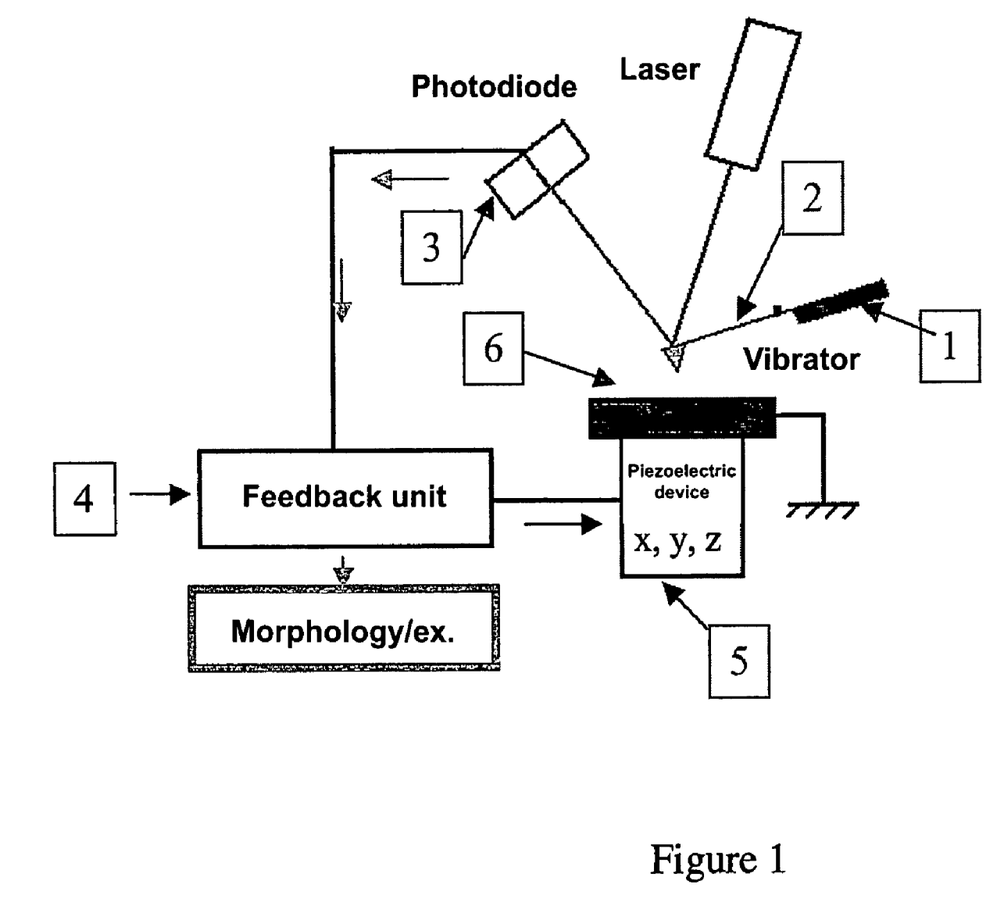
FIG. 1 depicts an atomic force microscope such as known in the prior art.

FIG. 1 shows an example of the general principle of the atomic force microscope in which a vibrator 1 excites a sensor 2 made up of a lever arm and a probe tip (or point) at its end. The movement of the lever varies the reflected signal of the laser—positioned level with the probe tip—, which is then detected by a photodiode 3. The signal emitted by the photodiode is then used to control a feedback unit 4 which controls a piezoelectric device in x, y, z 5 associated with the sample 6, the feedback taking place on the component z, and a scan being performed in x, y. The morphology of the sample 6 is then obtained at the output of the negative feedback loop.

Such devices have a first limitation in the performance of high-speed imaging, in particular for high-resolution images, when it is required, for example, to obtain images of 4096× 4096 pixels, in the air or in a controlled atmosphere and, even more so, in a vacuum. The device is therefore physically limited by the response time of the oscillator to a local disturbance.

Indeed, the stabilisation time constant is around 2 ms in the air due to the damping phenomena, falling to 800 ms in a vacuum. This difference does not furthermore allow current systems to reach a scanning speed which is compatible with processing time constraints.

More precisely, an oscillator having a quality coefficient Q and vibrating at a resonant frequency $f_0$ (or a period $T_0$), takes a time $T=Q*T_0$ change from one stable state to another stable state. The quality coefficient is furthermore defined in relation to the frequency bandwidth df of the resonance curve. It is known that this frequency is that providing an amplitude equal to $$\frac{1}{\sqrt{2}} \times A_0,$$

$A_0$ being the maximum amplitude. We therefore find that $Q=f_0/df$.

The scanning speed is therefore limited by the time T for stabilising the oscillator between several successive pixels.

Several solutions for controlling the quality factor Q exist in the prior art, but none are truly satisfactory for using the device in a vacuum or ultra-high vacuum (UHV). One example of such a control is provided in the first publication on this subject "Regulation of a micro-cantilever response by force feedback", Applied Physics Letters, Volume 62(19), 2344, 10 May 1993, J. Mertz, O. Marti, J. Mlynek.

The present invention therefore aims to provide a new atomic force microscope enabling the performance in the air (or controlled atmosphere) to be maintained and even increased, but which can also operate in a vacuum or ultra-high vacuum. According to one aspect of the invention, the quality factor of the oscillator is therefore reduced in a novel manner, no longer working on the fundamental of the sensor, but on higher-order harmonics.

It is known, in particular from the publication by Stark et al. "Tapping-mode atomic force microscopy and phase-imaging in higher eigenmodes", 1999, to use a higher-order harmonic in an atomic force microscope. In the publication by Stark et al., the first harmonic is used in environmental conditions.

However, the system described in the aforementioned publication does not allow the system to operate with harmonics other than the first harmonic.

Furthermore, the system described in the aforementioned publication does not make it possible to choose the higher harmonic that is best suited to the correct operation of the system.

The present invention aims to solve the disadvantages of the prior art.

One aim of the invention is to improve the operation of known atomic force microscopes.

Another aim of the invention is to improve the quality factor of an atomic force microscope, in particular in a vacuum or in a controlled atmosphere.

Another aim of the invention is to supply an atomic force microscope comprising a probe tip, in which the probe tip can oscillate at frequencies according to a plurality of harmonics of a lever arm.

Another aim of the invention is to supply an atomic force microscope comprising a probe tip, the probe tip being capable of oscillating at frequencies according to various harmonics, and the chosen harmonic being suited to the quality of operation of the microscope.

Another aim of the invention is to supply an atomic force microscope comprising a probe tip, the probe tip being capable of oscillating at frequencies according to various harmonics, and in which the chosen harmonic is suited to the quality of operation of the microscope, even in a vacuum or a controlled atmosphere.

Another aim of the invention is to supply an atomic force microscope comprising a probe tip, the probe tip being capable of oscillating at frequencies according to various harmonics, it being possible to choose the harmonic automatically.

For this purpose, the invention relates to a method for measuring surface features of a sample by means of a probe tip placed on one end of a lever arm, said lever arm being capable of oscillating by means of a vibrator, in an atomic force microscopy system, including steps consisting of:

oscillating said tip of the lever arm according to a first oscillation frequency corresponding to a fundamental of said lever arm;

producing a signal that represents said oscillation defining a parameter corresponding to an operating threshold of said microscopy system analysing said signal and, if said signal corresponds to a state of said system above said operating threshold, changing the oscillating frequency of said tip of the lever arm by changing the excitation frequency of the vibrator according to at least one higher-order harmonic of said lever arm.

selecting one of said corresponding higher-order harmonics for which the signal representing the oscillation corresponds to a system state equal to or below said operating threshold;

making said oscillating probe tip interact with said selected higher harmonic in order to measure the surface features of said sample.

It is understood, for the purpose of the present application, that the notion of a system state being above or below than an operating threshold is relative and depends on the measurements used. In order to maintain consistency with FIGS. 5 and 6, the system state is considered to be satisfactory when it is equal to or below the operating threshold, meaning that, according to the invention, when the state is higher, higher harmonics are sought.

The invention also concerns an atomic force microscopy system comprising a probe tip placed on one end of a lever arm, oscillating means adapted to oscillate said probe tip substantially according to the fundamental frequency of said lever arm, and scanning means designed to produce a translation between the oscillating probe tip and the surface of the sample so that the tip of the nozzle interacts with said surface, said system comprising control means capable of controlling said oscillating means to vary the oscillation frequency of said tip according to a plurality of harmonics of said lever arm, characterised in that said system also comprises means for detecting the interaction between the probe tip and said surface, said detection means being capable of supplying a signal representing data of said surface and in that said control means comprise an input receiving a parameter representing an operating threshold of said system, to vary the oscillation frequency of said tip according to at least one harmonic of said lever arm when said signal corresponds to a state of said system above said operating threshold.

This system is suitable for implementing the method described above.

The invention will be understood better from the following description, provided merely for the purpose of explanation, of one embodiment of the invention, in reference to the appended drawings.

Figure 2:
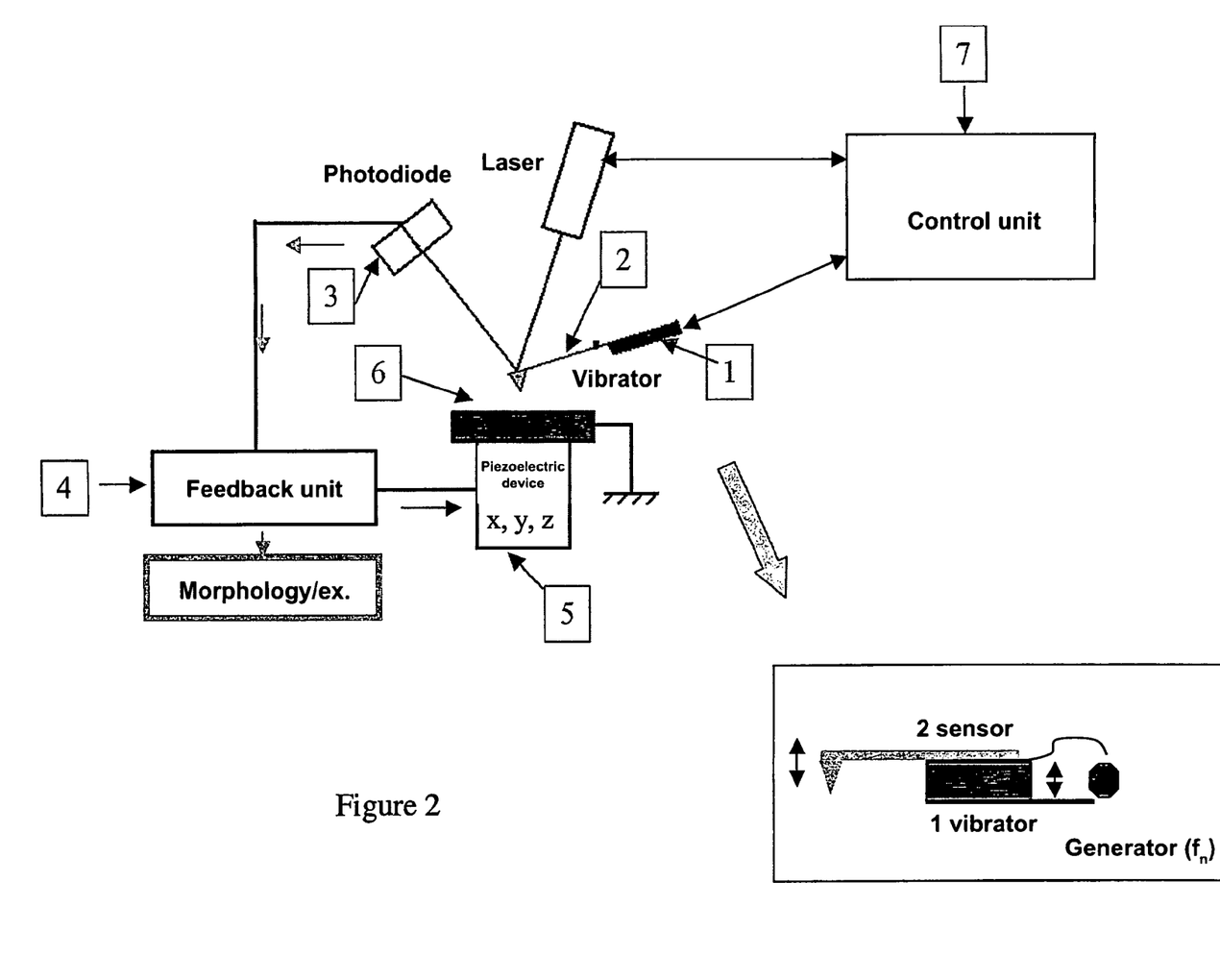
FIG. 2 depicts an atomic force microscope with controlled amplitude according to the invention.

As shown in FIG. 2, the atomic force microscope according to the invention comprises, in a well known manner, oscillation means 1, for example in the form of a vibrator 1, which excite a sensor 2, made up of a lever arm and a probe tip. The movement of the lever—and of the tip associated with it—varies the reflected signal of the laser, for example, which is then detected by detection means in the form of a photodiode 3. The signal emitted by the photodiode is then used to control a feedback unit 4 which controls a piezoelectric device in x, y, z 5 associated with the sample 6, the feedback taking place on the component z, and a scan being performed in x, y. The morphology of the sample 6 is then obtained at the output of the negative feedback loop.

According to the invention, the device also includes a control unit 7 designed to control the frequency of the vibrator 1 and the resonance curve of the sensor associated with it (for example, phase amplitude, resonant frequency and quality coefficient $Q_n$). The control unit is arranged to select the frequencies corresponding to the fundamental of the sensor 2 and to various higher-order harmonics of the sensor.

Figure 4:
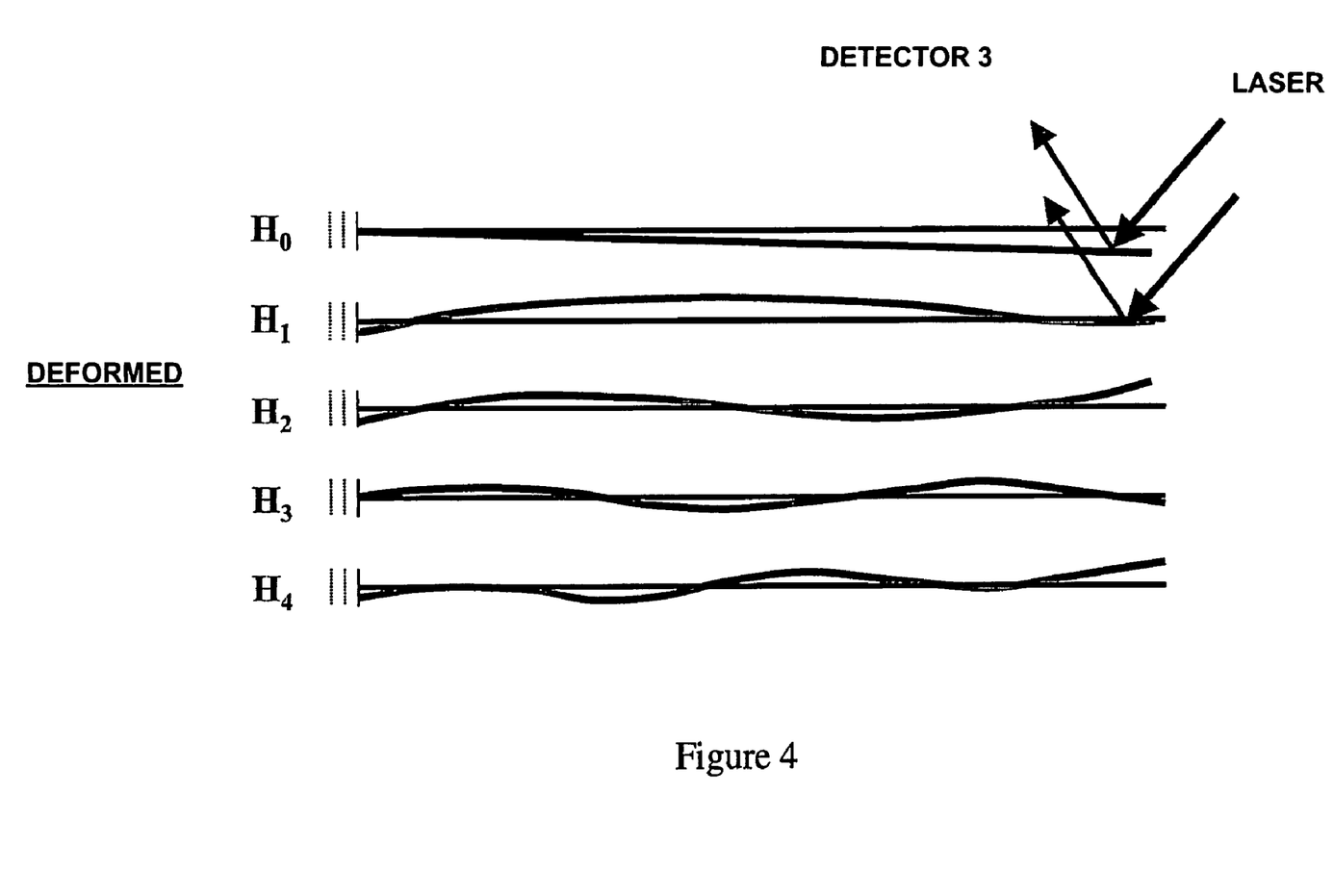
FIG. 4 depicts the various vibration modes of a lever arm fixed at one end, including the modes corresponding to the higher harmonics used in the present invention.

For the purpose of the present application, "higher-order harmonic" will be used to refer to any sensor vibration frequency according to a specific mode other than the fundamental. The fundamental will be designated $H_0$, and the associated harmonics will be $H_1, H_2, \ldots H_n$. The vibration modes of a vibrating beam are shown in FIG. 4.

The controller 7 then allows the vibrator 1 to be excited according to one of the modes $H_0, \ldots H_n$ of the sensor 2, and is therefore suitable for high excitation frequencies, typically higher than 2 MHz.

Those skilled in the trade will understand that by increasing the order of the harmonics used for the vibration, the response time of the sensor is reduced, which allows faster scanning of the surface of the sample to be analysed.

A parameter $\tau_f$ is thus defined, corresponding to the acceptable response time in terms of calculation time and, therefore, scanning speed.

Figure 5:
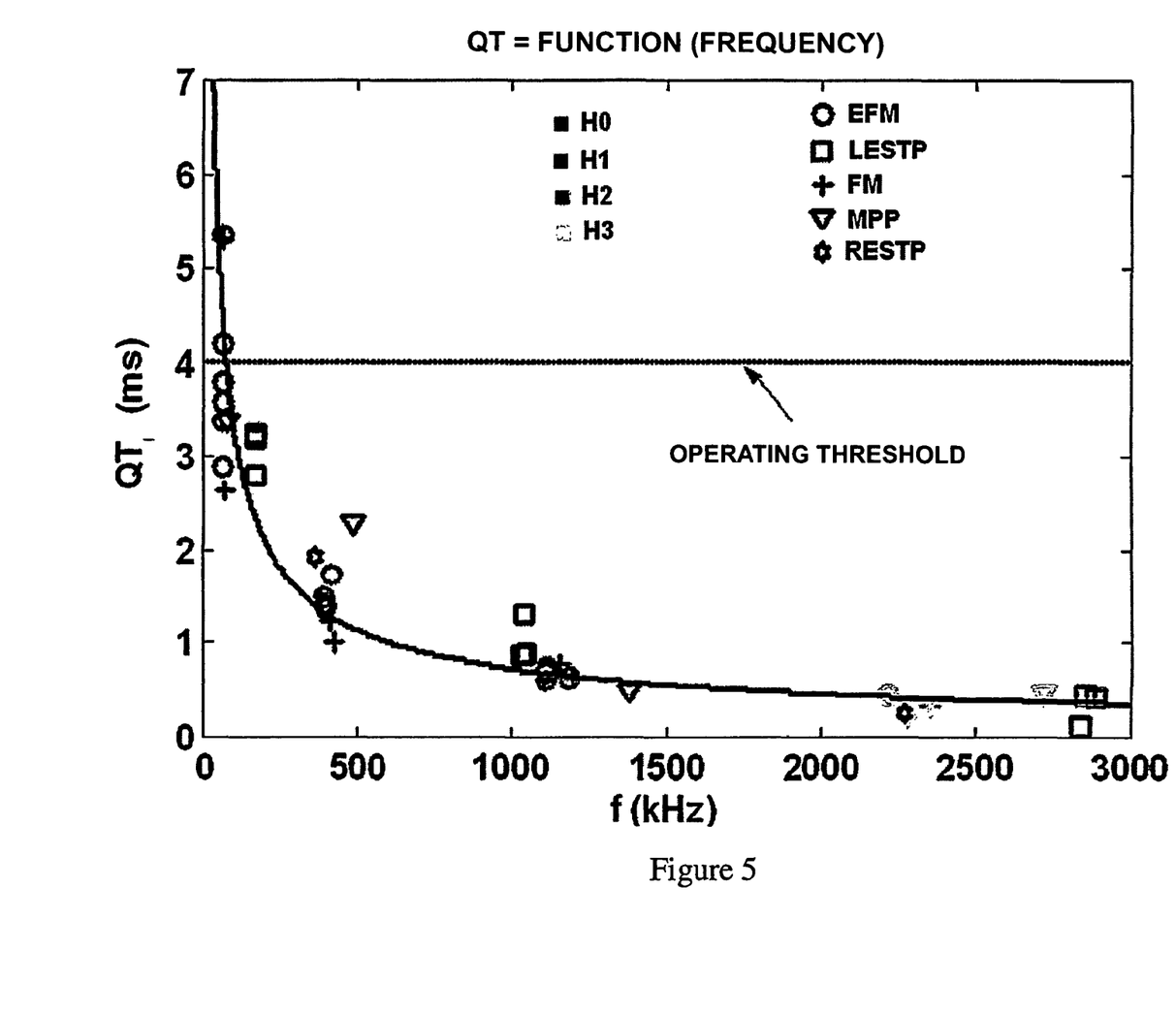
FIG. 5 depicts the response time of the sensor according to the excitation frequency, in relation to an operating threshold $\tau_f$, for different types of sensors, in the air.

FIG. 5 depicts the response time of the sensor according to the excitation frequency, in relation to an operating threshold $\tau_f$, for different types of sensors, in the air.

This figure shows how response time decreases with the oscillation frequency. Thus, with an operating threshold such as described by the horizontal full line, it can be seen on the one hand that, for certain types of sensors, even at the fundamental frequency, the response time is too high to allow satisfactory operation (peak of the curve above the threshold). The invention therefore allows the system, by working with a higher harmonic thanks to the control unit, to operate below the threshold in a satisfactory fashion.

It can be seen on the other hand that if the operating threshold is to be reduced in order further to increase the performance of the device, it is necessary for most of the sensors to be placed on higher harmonics. This is also made possible by the control unit 7.

Figure 6:
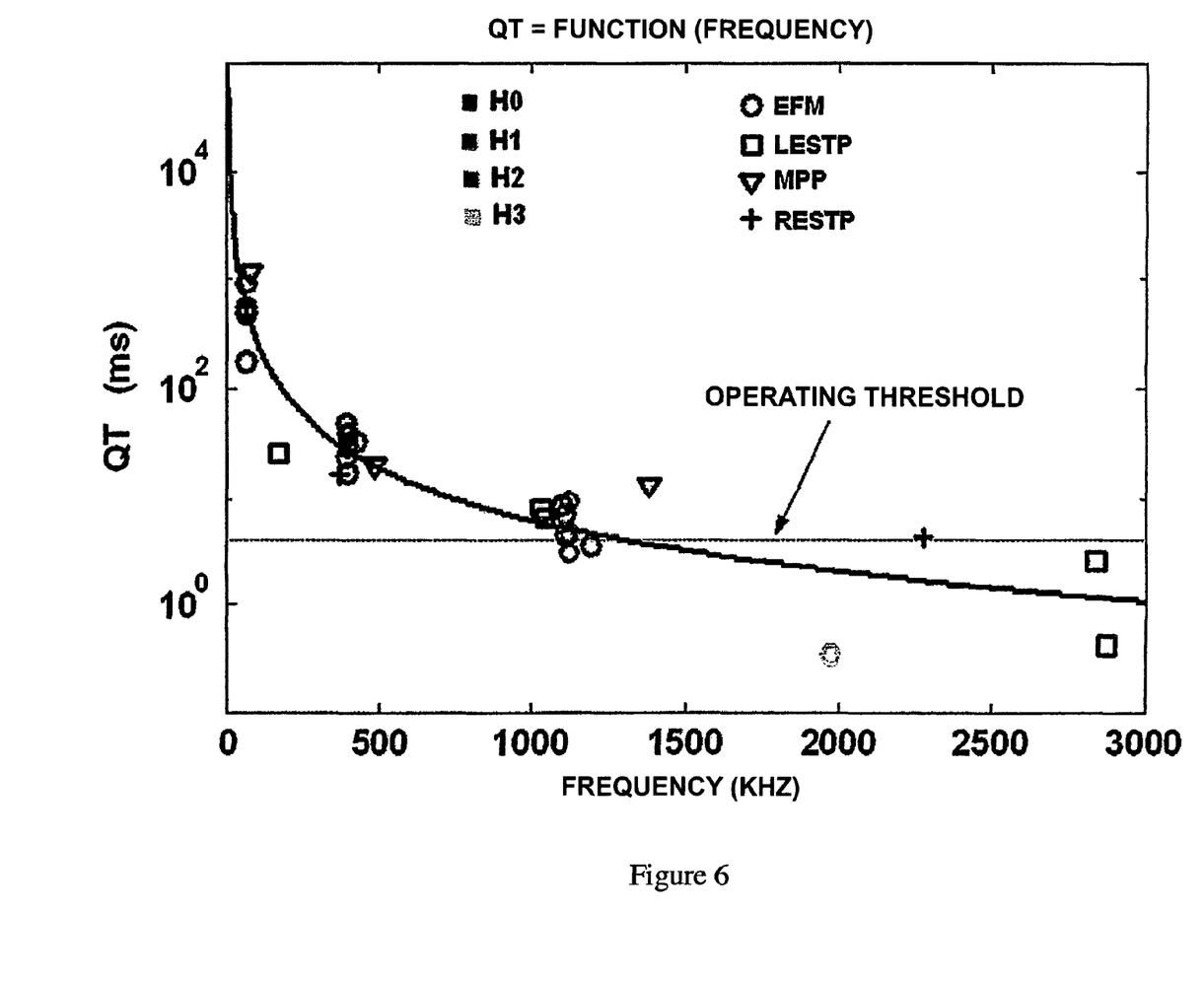
FIG. 6 depicts the response time of the sensor according to the excitation frequency, in relation to an operating threshold $\tau_f$, for different types of sensors, in a vacuum.

FIG. 6 in this case depicts the response time of the sensor according to the excitation frequency, in relation to the same operating threshold $\tau_f$ for different types of sensors, in a vacuum.

The very sharp drop in the response time—also due to the reduced quality factor—with the excitation frequency has already been seen in the vacuum, with the scale shown.

No sensor can therefore provide satisfactory scanning for its fundamental frequency nor, in most cases, for the first order harmonic.

According to the invention, it is therefore possible to configure the control device 7 to set the oscillation frequency to higher-order harmonics 1, 2 or more in the event of working in a vacuum.

Figure 3:
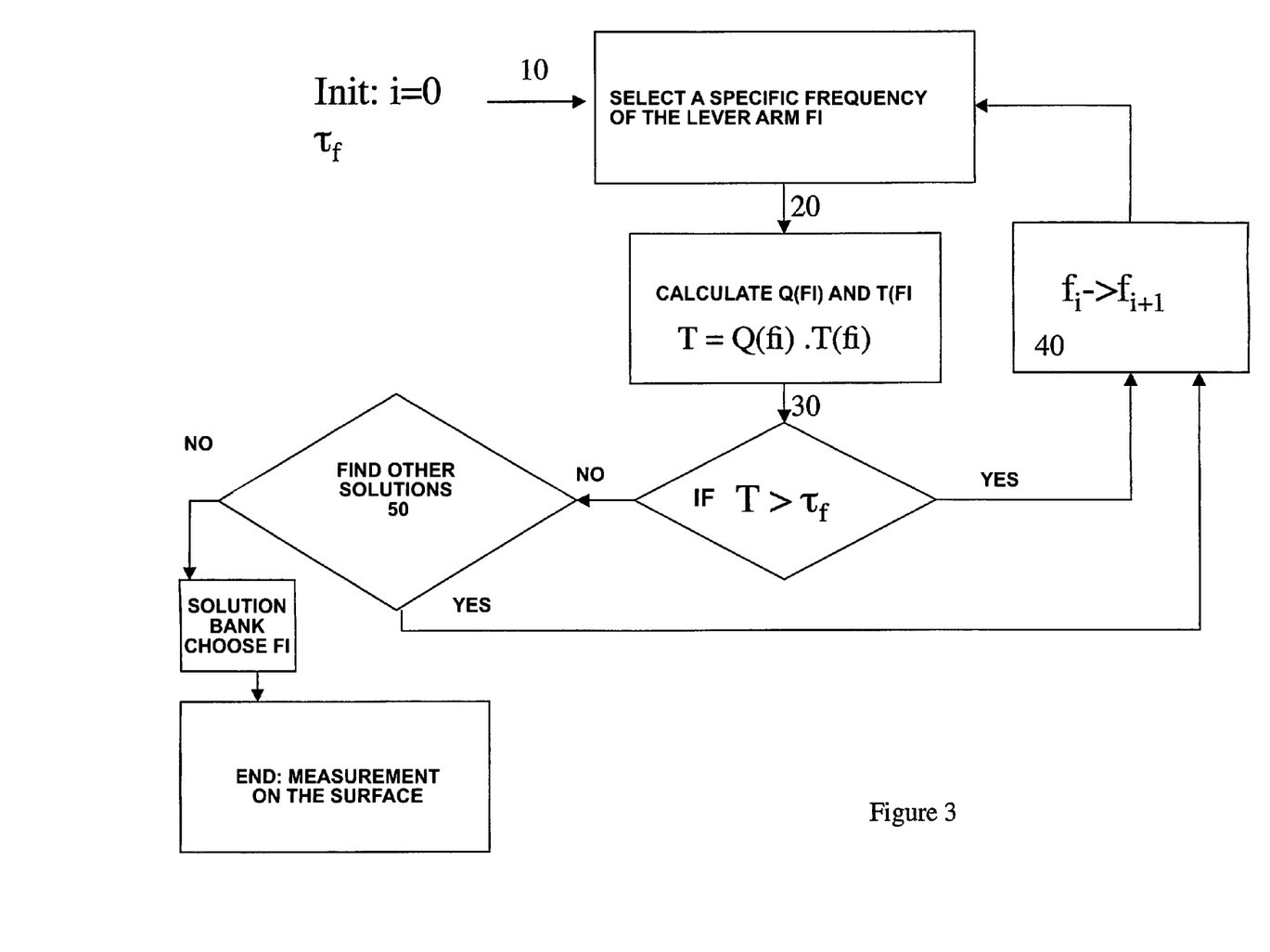
FIG. 3 depicts the method for automating surface data calculation by increasing the order of the harmonics.

As shown in FIG. 3, the invention also provides a method for automatically implementing the optimum operating mode of an atomic force microscope with variable frequency.

For this, the control unit comprises calculation means which can use the parameters of the sensor as input, and provide a control of the oscillation means 1 as output through the vibrator.

The control program is initialised 10 at an oscillation frequency corresponding to the fundamental of the sensor. It is, however, understood that it can also be initialised at a higher-order harmonic if it is known that it will be used in a vacuum and the fundamental will be unusable.

In this case, the stabilisation time associated with the quality factor of the sensor in this vibration mode is calculated 20, testing 30 whether this stabilisation time is shorter than the predefined threshold time $\tau_f$.

If it is not, the method is repeated 40 changing to a higher-order harmonic $H_i \rightarrow H_{i+1}$. The maximum value of i can be predefined.

It has obviously been noted that when the response time curve according to the frequency is decreasing, this algorithm implemented in the control unit converges towards one or several satisfactory harmonics, regardless of the type of sensor used.

Once a satisfactory higher-order harmonic $H_f$ is identified, the surface of the sample is characterised in a well-known manner with a vibration mode $H_f$. Furthermore, it is understood that once an acceptable harmonic is selected, it is also possible to find 50 new finer solutions to further improve the level of operation of the system. Those skilled in the trade are then capable of determining an acceptable compromise between the processing time required to find the harmonics, the quality of the device at high frequency if the frequency is increased too much, and the result obtained.

This guarantees that scanning the surface will respect the temporal constraints defined by the threshold $\tau_f$.

The previously described invention is therefore particularly well suited for use in a vacuum or an ultra-high vacuum (UHV), for example when the microscope is associated with a vacuum pump, as well as in the air or in a controlled atmosphere when high-speed scanning is required.

It is also understood that the invention can be used in tapping mode or contactless mode. Those skilled in the trade will be capable of adapting the device by simple routine processes.

It is noted, in addition, that the system can be used to characterise local mechanical property differences based on, for example, the so-called "morphology" signal, by comparing the results obtained with various harmonics. This is applicable in the air or in a controlled atmosphere where all harmonics are generally satisfactory and in a vacuum (and UHV), as long as several satisfactory harmonics have been determined.

Indeed, the apparent stiffness of the sensor $K_n$ on the mode n, becomes $K_n = (f_n/f_0)^2 K_0$ and the range of stiffnesses covered is even broader the greater the range of fn. Next we will see the consequences this has on so-called "morphology" imaging. Imagine a material with a "hump" at the centre of a plane, and assume that the hardness of this "hump" is locally reduced in relation to the surrounding plane. The use of a high harmonic "hardens" the sensor in relation to this sample, which encourages the local indentation and dampens the "morphology signal" when referring to a weak harmonic. To simplify, at low harmonics, the real morphology remains visible, while it disappears at high harmonics.

This variation of the apparent stiffness makes it possible: a) to adapt the actual stiffness of the lever to the material use or to use a constant tip (diamond, for example), b) to increase the range of available stiffnesses ($K_0$ varies from 1 to 50 N/m and the coefficient due to the harmonics varies from 1 to 100). This idea can, for example, apply to quality control of mechanically polyphasic material (production), to counting of biological cells on a rigid medium. In addition, it can be extended to resonant systems other than atomic force microscopes for the purpose of examining contact areas with dimensions much larger than ten square nanometers.

It is noted, furthermore, that the system can be used in double pass mode, in which a first profile of the sample is detected and then, by bringing the probe closer or further according to this first profile, the long-distance force variations (i.e. the derivative of the force in relation to the direction of vibration of the sensor) or the electromagnetic signals (optical for example, if a photovoltage appears in the sensor) are detected at a constant and controlled distance. It should be noted that, in the second pass, the resonant frequency which can be practically used is often different (generally $H_0$ or $H_1$ with the stiffness $H_2$) from that defined previously for acquiring the morphology ($H_2$, for example, in a vacuum). Both theory and practice have shown that only $H_0$, $H_1$ and possibly $H_2$ can practically be used to detect force gradients.

Figure 7A:
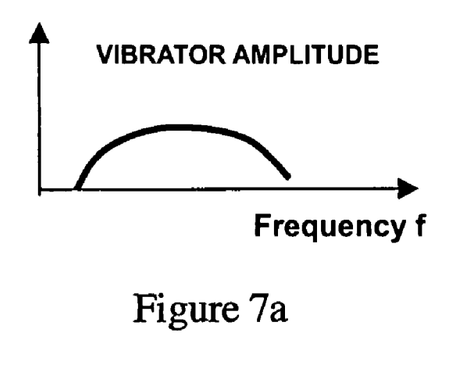
FIGS. 7a to 7c depict the response curves of the various vibrators.

Finally, in order to maintain the quality of the measurements even at high oscillation frequencies, it is preferable to modify the existing vibrators. Indeed, the amplitude response profile of a vibrator such as used in known AFM microscopes is substantially that depicted in FIG. 7a.

Figure 7B:
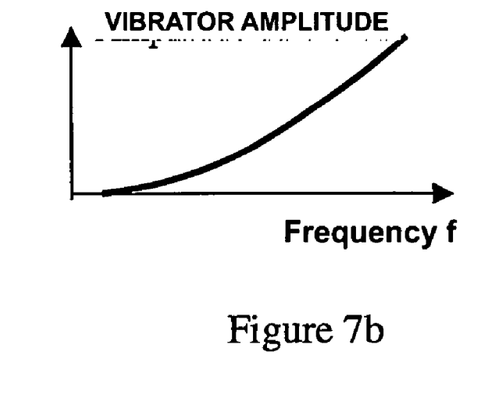

It can therefore be seen that the associated amplitude drops when the vibration frequency increases, and therefore when the harmonic order increases according to the method of the invention. And yet, it is desirable to work at a substantially constant amplitude and it is therefore preferable to modify the existing vibrators ideally to obtain a response such as depicted in FIG. 7b.

For this purpose, it can be chosen to position a plurality of vibrators in cascade. These can be coupled together, which is to say with similar resonant frequencies, or not coupled.

This produces an extension of the vibrator frequency spectrum and therefore makes it possible to adapt to the use of higher harmonics.

Figure 7C:
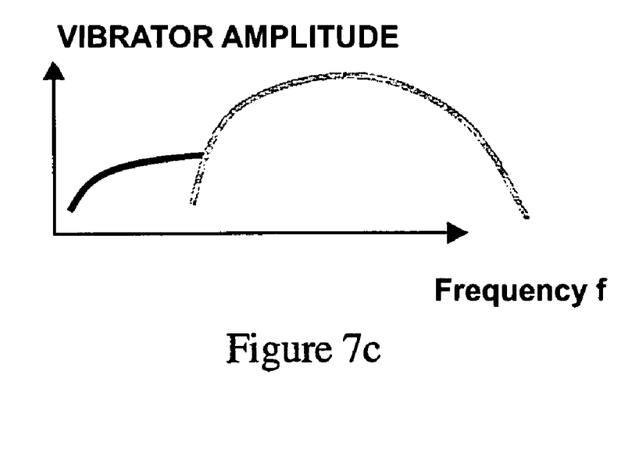

With a vibrator powered by a low-frequency generator associated with another high-frequency vibrator, it is possible, for example, to obtain an amplitude profile such as shown in FIG. 7c.

In general terms, existing vibrators are therefore modified in order to adapt the device to the use of high frequencies. Those skilled in the trade are therefore capable of adapting the electronics and the feedback to this new type of vibrator.

In general terms, the sensors can also be modified in order to produce responses in frequencies that are suited to the required work, adapting the quality coefficient of the resonance Qn(f) associated with Hn. For example, for high-speed scanning in the air or in a controlled atmosphere as well as in a vacuum, it is useful to reduce Qn(f) with the frequency f, as shown in FIGS. 5 and 6 and, to increase the range of dynamic stiffnesses Kn, it is useful to keep Qn(f) as constant as possible.

The invention is described above as an example. It is understood that those skilled in the trade are capable of creating different variations of the invention without departing from the framework of the patent.

The invention claimed is:

1. Atomic force microscopy system comprising a probe tip placed on one end of a lever arm, oscillating means adapted to oscillate said probe tip substantially according to the fundamental frequency of said lever arm, and scanning means having a time for performing one scan designed to produce a translation between the oscillating probe tip and a surface of a sample so that the tip of the lever arm interacts with said surface, said system comprising:
    control means capable of controlling said oscillating means to vary the oscillation frequency of said tip according to one or more higher order harmonics of said lever arm to allow the surface of the sample to be scanned within a time period;
    means for detecting the interaction between the probe tip and said surface;
    wherein said detection means being is capable of supplying a signal representing data of said surface;
    wherein said control means comprises an input receiving a parameter corresponding to an operating threshold of said system, to vary the oscillation frequency of said tip according to at least one higher order harmonic of said lever arm when said signal corresponds to a state of said system above said operating threshold; and
    wherein the oscillation frequency is not varied during the time for performing the one scan.

2. Atomic force microscopy system according to claim 1, also comprising a unit for processing said signal.

3. System according to claim 1, wherein said oscillation means comprise a plurality of vibrators in cascade.

4. A method for measuring surface features of a sample by means of a probe tip placed on one end of a lever arm, said lever arm being capable of oscillating by means of a vibrator, in an atomic force microscopy system, the method comprising:
    oscillating said tip of the lever arm according to a first oscillation frequency corresponding to a fundamental frequency of said lever arm;
    producing a signal that represents said oscillation;
    defining a parameter corresponding to an operating threshold of said microscopy system;
    analysing said signal and, if said signal corresponds to a state of said system above said operating threshold;
    changing the oscillating frequency of said tip of the lever arm by changing the excitation frequency of the vibrator according to at least one higher-order harmonic of said lever arm to allow the surface of the sample to be scanned within a time period, wherein the oscillation frequency is not varied during the time period for performing the scan;
    selecting one of said corresponding higher-order harmonics for which the signal representing the oscillation corresponds to a system state equal to or below said operating threshold; and
    making said oscillating probe tip interact with said selected higher harmonic in order to measure surface features of said sample.

5. System according to claim 2, wherein said oscillation means comprise a plurality of vibrators in cascade.

6. The system of claim 1, wherein the parameter represents the response time of the lever.

7. The method of claim 4, wherein the parameter represents the response time of the lever.

8. The system of claim 1, wherein the parameter is the response time of the lever, the operating threshold is a predetermined operation time for performing the scan, and the control means varies the oscillation of said tip to achieve a response time of the lever below the predetermined operation time.

9. The system of claim 1, wherein the oscillation frequency of said tip is set to high-order harmonics of said lever arm.

10. Atomic force microscopy system comprising a probe tip placed on one end of a lever arm, an oscillator adapted to oscillate the probe tip substantially according to the fundamental frequency of the lever arm, and a scanner having a time period for performing one scan designed to produce a translation between the oscillating probe tip and a surface of a sample so that the tip of the lever arm interacts with the surface, the system comprising:
    a controller capable of controlling the oscillator to vary the oscillation frequency of the tip according to one or more higher order harmonics of the lever arm to allow the surface of the sample to be scanned within a time period;
    a detector capable of detecting the interaction between the probe tip and the surface; wherein the detector is capable of supplying a signal representing data of the surface;
    wherein the controller comprises an input receiving a parameter corresponding to an operating threshold of the system, to vary the oscillation frequency of the tip according to at least one higher order harmonic of the lever arm when the signal corresponds to a state of the system above the operating threshold; and
    wherein the oscillation frequency is not varied during the time period for performing one scan.

11. The system of claim 1, wherein the time period to scan the surface of the sample decreases as the harmonic order increases.

12. The system of claim 6, wherein the response time decreases as the harmonic order increases.

13. The system of claim 1, further comprising:
    a scanning speed to scan the surface of the sample within the time period, wherein the scanning speed increases as the harmonic order increases.

14. The system of claim 1, wherein the probe tip and the sensor are along the same axis.

* * * * *